US008804236B2

(12) United States Patent
Strahle et al.

(10) Patent No.: US 8,804,236 B2
(45) Date of Patent: *Aug. 12, 2014

(54) MICROSCOPY SYSTEM

(75) Inventors: Fritz Strahle, Heubach (DE); Christoph Hauger, Aalen (DE)

(73) Assignee: Carl Ziess Meditec AG, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/253,852

(22) Filed: Oct. 5, 2011

(65) Prior Publication Data

US 2012/0120486 A1    May 17, 2012

Related U.S. Application Data

(62) Division of application No. 12/090,629, filed as application No. PCT/EP2006/010157 on Oct. 20, 2006, now Pat. No. 8,054,543.

(30) Foreign Application Priority Data

Oct. 20, 2005  (DE) .......................... 10 2005 050 345
Mar. 17, 2006  (DE) .......................... 10 2006 012 388

(51) Int. Cl.
| G02B 21/00 | (2006.01) |
| G02B 15/14 | (2006.01) |
| G02B 21/02 | (2006.01) |
| G02B 21/22 | (2006.01) |

(52) U.S. Cl.
CPC .............. *G02B 21/025* (2013.01); *G02B 21/22* (2013.01); *G02B 15/14* (2013.01)
USPC ............ 359/380; 359/376; 359/368; 359/676

(58) Field of Classification Search
CPC ...... G02B 21/00; G02B 21/025; G02B 21/22; G02B 15/14
USPC .......................... 359/368–390, 431, 831–837
See application file for complete search history.

(56) References Cited

U.S. PATENT DOCUMENTS

| 3,911,209 A | 10/1975 | Bouwhuis |
| 4,518,231 A * | 5/1985 | Muchel et al. ................ 359/377 |

(Continued)

FOREIGN PATENT DOCUMENTS

| DE | 90 16 892.5 U1 | 4/1991 |
| DE | 195 46 746 A1 | 6/1996 |

(Continued)

OTHER PUBLICATIONS

Extended European Search Report for corresponding European Application No. 12 000 916.2 dated May 9, 2012, 10 pages.

(Continued)

*Primary Examiner* — Thong Nguyen
(74) *Attorney, Agent, or Firm* — Patent Portfolio Builders PLLC (57) ABSTRACT

A microscope system for imaging of an object that can be placed in an object plane of a microscope system includes an imaging system for providing at least one pair of optical imaging paths that include a stereoscopic angle in the object plane. The imaging system includes a first subsystem comprising a first plurality of optical lenses that are commonly traversed by both optical imaging paths of the at least one pair of optical imaging paths. The imaging system also includes a second subsystem comprising a second plurality of optical lenses that are traversed by only one optical imaging path. At least two optical lenses of the first plurality of optical lenses and at least two optical lenses of the second plurality of optical lenses are displaceable relative to one another along a common optical imaging path to respectively vary a magnification of the representation of the object.

14 Claims, 9 Drawing Sheets

(56) References Cited

U.S. PATENT DOCUMENTS

| | | | |
|---|---|---|---|
| 4,545,655 A * | 10/1985 | Fantone et al. | 359/399 |
| 4,702,570 A | 10/1987 | Yoshino et al. | |
| 4,838,671 A | 6/1989 | Papritz et al. | |
| 4,991,947 A | 2/1991 | Sander et al. | |
| 5,287,219 A * | 2/1994 | Hildebrand et al. | 359/368 |
| 5,612,816 A | 3/1997 | Strahle et al. | |
| 5,612,817 A | 3/1997 | Strahle | |
| 5,701,196 A | 12/1997 | Nakamura | |
| 5,822,114 A | 10/1998 | Hanzawa | |
| 5,856,883 A * | 1/1999 | Sander | 359/389 |
| 5,912,763 A | 6/1999 | Spink | |
| 6,304,374 B1 | 10/2001 | Hanzawa | |
| 6,327,079 B1 | 12/2001 | Namii et al. | |
| 6,598,972 B2 | 7/2003 | Strahle | |
| 6,631,036 B2 | 10/2003 | Schuster | |
| 7,369,306 B2 | 5/2008 | Straehle | |
| 7,933,065 B2 * | 4/2011 | StrÄHle et al. | 359/376 |
| 8,054,543 B2 | 11/2011 | Strahle et al. | |
| 2002/0075449 A1 | 6/2002 | Strahle | |
| 2002/0085273 A1 | 7/2002 | Ito | |
| 2003/0165012 A1 | 9/2003 | Straehle et al. | |
| 2004/0091259 A1 | 5/2004 | Hanzawa | |
| 2004/0120032 A1 | 6/2004 | Sander | |
| 2004/0136059 A1 | 7/2004 | Sander | |
| 2004/0164214 A1 | 8/2004 | Gartner et al. | |
| 2004/0184141 A1 | 9/2004 | Sander | |
| 2004/0223213 A1 | 11/2004 | Fukuyama et al. | |
| 2004/0263958 A1 * | 12/2004 | Bihr et al. | 359/382 |
| 2005/0111088 A1 | 5/2005 | Winterot et al. | |
| 2005/0174655 A1 | 8/2005 | Straehle et al. | |
| 2005/0248837 A1 | 11/2005 | Sase et al. | |
| 2006/0012854 A1 | 1/2006 | Sander | |
| 2006/0023300 A1 | 2/2006 | Sander | |
| 2006/0141662 A1 | 6/2006 | Brabec et al. | |
| 2007/0127115 A1 | 6/2007 | Hauger et al. | |
| 2008/0117501 A1 | 5/2008 | Sander | |

FOREIGN PATENT DOCUMENTS

| | | |
|---|---|---|
| DE | 197 18 102 A1 | 12/1997 |
| DE | 01 33 671 A1 | 1/2002 |
| DE | 103 00 925 A1 | 9/2003 |
| DE | 103 30 581 A1 | 3/2004 |
| DE | 102 55 961 B3 | 4/2004 |
| DE | 102 55 960 A1 | 6/2004 |
| DE | 102 55 965 A1 | 6/2004 |
| DE | 102 55 967 A1 | 6/2004 |
| DE | 102 55 964 A1 | 7/2004 |
| DE | 103 12 681 A1 | 10/2004 |
| DE | 103 12 471 A1 | 12/2004 |
| DE | 103 23 091 A1 | 12/2004 |
| DE | 103 32 603 A1 | 2/2005 |
| DE | 103 55 527 A1 | 6/2005 |
| DE | 10 2004 052 253 A1 | 7/2005 |
| DE | 10 2005 050 345.4 | 10/2005 |
| DE | 10 2005 013 570 A1 | 11/2005 |
| DE | 10 2005 021 569 A1 | 12/2005 |
| DE | 10 2006 012 388 A1 | 4/2007 |
| EP | 0 511 443 A1 | 11/1992 |
| EP | 0 582 148 B1 | 2/1994 |
| EP | 0 363 762 B1 | 1/1996 |
| EP | 1 293 819 A1 | 3/2003 |
| EP | 1 580 586 A1 | 9/2005 |
| JP | 6-337351 A | 12/1994 |
| JP | 7-140395 A | 6/1995 |
| JP | 10260359 A | 9/1998 |
| JP | 10-282428 A | 10/1998 |
| JP | 11-84263 A | 3/1999 |
| JP | 2001117009 A | 4/2001 |
| JP | 2002090650 A | 3/2002 |
| JP | 2002-174773 A | 6/2002 |
| JP | 2004-325868 A | 9/2003 |
| JP | 2005-070809 A | 3/2005 |
| WO | WO 2007/045500 A1 | 4/2007 |

OTHER PUBLICATIONS

Office Action for corresponding Japanese Application No. 2008-535979 dated Mar. 27, 2012, 7 pages. [English translation].

Gerlach, "Das Lichtmikroskop," Georg Thieme Verlag, 1976, ISBN: 3-13-530301-2, p. 20-23 (with English translation), Stuttgart, 7 pages.

Office Action of German Patent Application No. 10 2006 012 388, mailed Mar. 11, 2010, 6 pages.

* cited by examiner

MICROSCOPY SYSTEM

CROSS-REFERENCES TO RELATED APPLICATIONS

This application is a division of U.S. patent application Ser. No. 12/090,629, filed on Apr. 17, 2008, now U.S. Pat. No. 8,054,543, which is a National Stage application of PCT/EP2006/010157, filed on Oct. 20, 2006, which claims priority to German Patent Application Nos. 10 2005 050 345.5, filed on Oct. 20, 2005 and 10 2006 012 388.3, filed on Mar. 17, 2006. The disclosures of these applications are hereby incorporated by reference in their entirety.

BACKGROUND OF THE INVENTION

The present invention relates to a microscope system for imaging an object that can be placed in an object plane of the microscope system.

The microscope system comprises at least one imaging system that provides at least one optical imaging path for imaging a field of view of the object plane.

Microscope systems of this sort are used, for example, in medical technology as surgical microscopes, to observe an object placed in an object plane.

Such an optical microscope is, for example, known from the German laid-open patent application DE 103 00 925 A1.

With respect to surgical microscopes it is generally desirable to achieve a compact construction, i.e. a small overall height and a small volume. The reason for this is that the surgical microscope should not unduly restrict accessibility to a patient by an attending physician during surgery.

Figure 8:
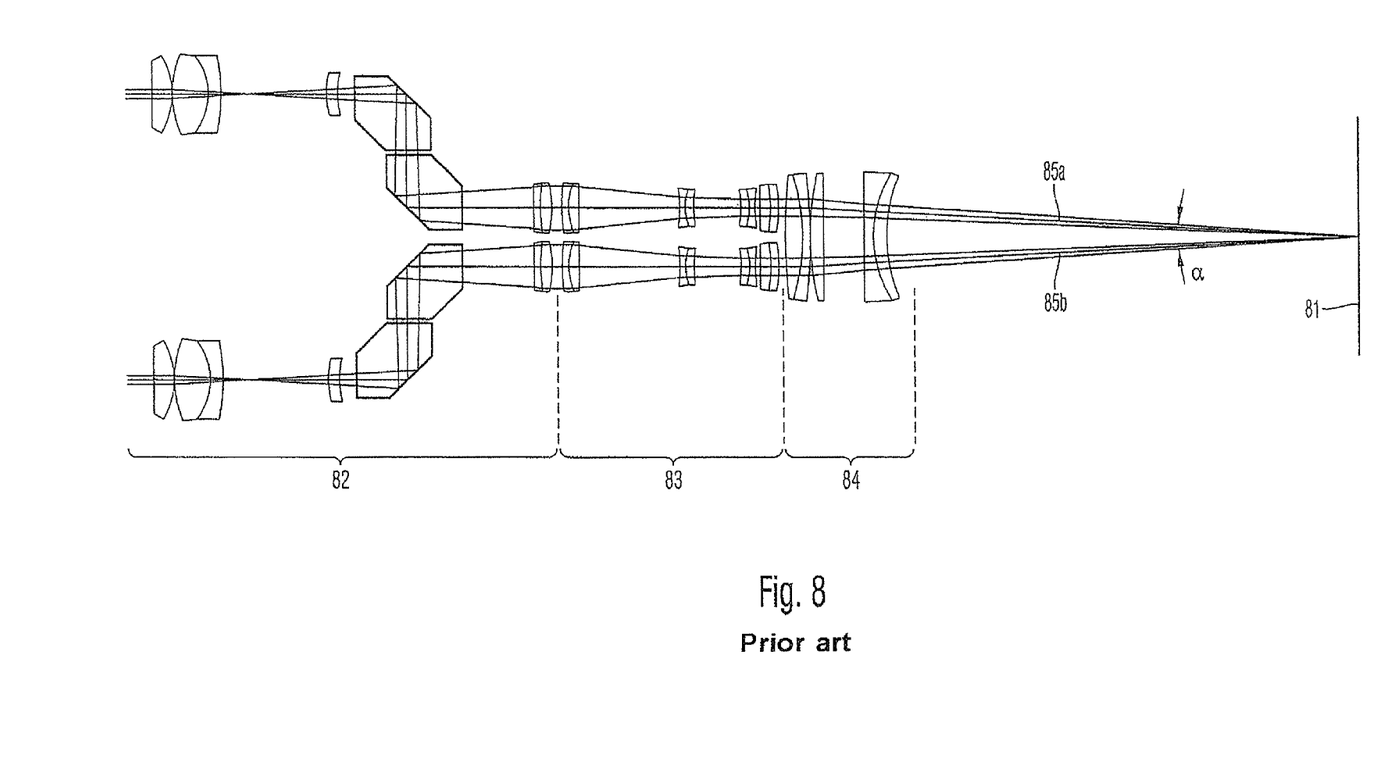
FIG. 8 schematically shows the general structure of a microscope system according to the prior art.

As shown in FIG. 8, a surgical microscope usually consists of a Kepler telescope 82, a zoom system 83 and a main objective 84. The Kepler telescope in FIG. 8 comprises a binocular tube. The Kepler telescope 82, the zoom system 83 and the main objective 84 are arranged in series along the respective optical imaging paths 85a, 85b, guided by these elements and provide imaging an object not shown in the Figure) that is placed in an object plane 81. Afocal interfaces are provided in-between the Kepler telescope 82, the zoom system 83 and the main objective 84, in which afocal interfaces the optical imaging paths are each imaged to infinity, to provide a modular structure of the surgical microscope. As shown in FIG. 8, such microscopes are frequently built as stereoscopic microscope systems. In stereoscopic microscope systems, at least two optical imaging paths 85a and 85b are guided such that the optical imaging paths include a stereoscopic angle α, different from zero, in the object plane 81. Afocal interfaces are provided in-between the Kepler telescope 82, the zoom system 83 and the main objective 84, in which afocal interfaces the optical imaging paths are each imaged to infinity, to provide a modular structure of the surgical microscope. As shown in FIG. 8, such microscopes are frequently built as stereoscopic microscope systems. In stereoscopic microscope systems, at least two optical imaging paths 85a and 852 are guided such that the optical imaging paths include a stereoscopic angle a, different from zero, in the object plane 81.

Furthermore, a beam splitting prism, which is not shown in FIG. 8, is frequently provided between the Kepler telescope and the zoom system, to provide an optical path for co-observation.

Therefore, it is an object of the present invention to provide a microscope system wherein the imaging system necessary to provide the desired total magnification has an especially compact structure.

It is a disadvantage of conventional surgical microscopes that they have a large overall height and a large volume, dependent on a provided total magnification.

The above object is achieved by a microscope system. Preferred embodiments are defined in the dependent claims.

According to a first embodiment, the above object is achieved by a microscope system for imaging an object that can be placed in an object plane of the microscope system, wherein the microscope system comprises an imaging system containing several optical elements for providing at least one optical imaging path. The several optical elements comprise a plurality of optical lenses, through which the at least one optical imaging path passes in sequence, and which image the object plane in an intermediate image. The optical lenses are configured in such a way that the representation of the object plane in the intermediate image is demagnified to a maximum of 0.9 times, preferably to a maximum of 0.8 times, further preferably to a maximum of 0.6 times, and especially to a maximum of 0.5 times. In this respect, "demagnified to a maximum of 0.9 times" means that the representation of the object plane in the intermediate image is demagnified by 0.1 (i.e. 10) or more.

Consequently, the microscope system is capable of firstly imaging an object placed in the object plane in a demagnified way in the intermediate image. This intermediate image can then be magnified by subsequent optics, until a desired total magnification is achieved. Due to the demagnified representation of the object placed in the object plane in the intermediate image, it is possible to build the optics following the intermediate image in an especially compact way, such that the microscope system has an especially compact structure when compared to a microscope system known from the prior art providing the same total magnification.

It can be advantageous that the several optical elements of the imaging system provide at least one pair of optical imaging paths, which include a first stereoscopic angle in the object plane, wherein the optical imaging paths include a second stereoscopic angle in the intermediate image, and wherein a ratio of the first stereoscopic angle in the object plane to the second stereoscopic angle in the intermediate image is smaller than 0.9 and especially smaller than 0.8, and further especially smaller than 0.6.

Consequently, the stereoscopic angle in the intermediate image is enlarged, when compared to the stereoscopic angle in the object plane, and as a result the optical imaging paths can be separated with ease by the optics following the intermediate image, not withstanding the demagnification of an object placed in the object plane. Therefore a desired stereoscopic impression is guaranteed.

According to a further embodiment, which can be combined with the first embodiment, the above object is achieved by a microscope system for imaging an object that can be placed in an object plane of the microscope system, wherein the microscope system comprises an imaging system containing several optical elements, to provide at least one pair of optical imaging paths that include a first stereoscopic angle in the object plane. The several optical elements contain a plurality of optical lenses through which the at least one pair of optical imaging paths passes in sequence, and which image the object plane in an intermediate image. The optical imaging paths include a second stereoscopic angle in the intermediate image. A ratio between the first stereoscopic angle in the object plane to the second stereoscopic angle in the intermediate image is smaller than 0.9 and especially smaller than 0.9, and further especially smaller than 0.6.

This enlargement of the stereoscopic angle in the intermediate image, in comparison to the stereoscopic angle in the object plane, facilitates a separation of the optical imaging paths by optical elements imaging the intermediate image. Consequently, the microscope system can be built in an especially compact way, as the optical imaging paths diverge to a higher degree in comparison to the prior art.

According to an embodiment, the optical imaging paths can commonly traverse the optical lenses. In this case, the optical imaging paths can be guided in the lenses such that the intermediate image is arranged in-between two regions, in which a distance of stereoscopic axes of the optical imaging paths from an optical axis defined by the lenses, respectively, is maximized. It is not necessary that the optical axis runs along one single straight line, but it is even possible that the optical axis is folded. The stereoscopic axes are defined by the respective centers of the at least two (stereoscopic) optical imaging paths for one object point of the object that can be placed in the object plane, which object point corresponds to the center of the representation caused by the microscope system.

According to a further embodiment, the at least one optical imaging path can be guided in the lenses in a way that the intermediate image is arranged in-between two regions, in which a diameter of a beam bundle guided by the at least one optical imaging paths, respectively, is maximized.

Furthermore, a first set of optically effective surfaces of lenses can be arranged between the intermediate image and the first region of the two regions, in which at least one of a distance of stereoscopic axes of the optical imaging path from the optical axis and a diameter of a beam of light guided by the at least one optical imaging path, respectively, is maximized. This first region is arranged between the intermediate image and the object plane. Further, a second set of optically effective surfaces of lenses can be arranged between the intermediate image and the second region of the two regions, and a third set of optically effective surfaces of lenses can be arranged between the first region and the object plane. The surfaces of one optical lens may belong to one set or else to different sets.

It can be advantageous if a ratio of the total focal length (sum of the focal lengths) of the optically effective surfaces of the first set to the total focal length of the optically effective surfaces of the second set is at least 1.1, and especially at least 1.2, and further especially at least 1.4.

It can be further advantageous if a ratio of the total focal length (sum of the focal lengths) of the optically effective surfaces of the first set to the total focal length of the optically effective surfaces of the third set is between 0.2 and 0.6, and especially between 0.3 and 0.5, and further especially 0.4.

Further advantages can be achieved if a ratio of the total focal length of the optically effective surfaces of the second set to the total focal length of the optically effective surfaces of the third set is between 0.1 and 0.6, and especially between 0.2 and 0.5, and further especially 0.3.

The ratios defined above of the total focal length of the sets of optically effective surfaces can provide a demagnified representation of an object that can be placed in the object plane into the intermediate image in an especially easy way. It can be further advantageous if the ratio of the respective distances of the stereoscopic axes of the optical imaging paths to the optical axis in the first region to the respective distances of stereoscopic axes of the optical imaging paths to the optical axis in the second region is not more than 1.1 and especially not more than 1.2 and further especially not more than 1.4.

Consequently, the optical imaging paths in the first region between the intermediate image and the object plane are separated to a larger extent than in the second region behind the intermediate image. Due to the reduction of this distance it is possible to build the microscope system in an especially compact way.

To facilitate a modular structure of the microscope system, the lenses may be adapted to represent the optical imaging paths, at least in one of the regions in which at least one of the distance of stereoscopic axes of the optical imaging paths to the optical axis and the diameter of a beam bundle guided in at least one optical imaging path is maximized, to infinity.

According to an embodiment, the imaging system may comprise first, second, third and fourth mirror surfaces, for deflecting the at least one optical imaging path, wherein the at least one optical imaging path is reflected in sequence on the first mirror surface, the second mirror surface, the third mirror surface, and the fourth mirror surface. An especially compact structure of the microscope system can be achieved by this multiple deflection of the optical imaging paths.

The first and fourth mirror surfaces may include, relative to one another, an angle of between 80° and 100° and especially 90°, and the second and third mirror surfaces may include, relative to each other, an angle of between 80° and 100° and especially 90°, and the third and fourth mirror surfaces may include, relative to each other, an angle of between 50° and 70° and especially 60°. Consequently, the mirror surfaces provide a Porro-system of the second kind.

According to an embodiment the imaging system provides at least one pair of optical imaging paths that include a stereoscopic angle in the object plane, and the imaging system contains a first subsystem containing several optical lenses arranged along one common optical imaging path, which optical lenses are commonly traversed by both optical imaging paths of the at least one pair of optical imaging paths.

At least one of the second, third and fourth mirror surfaces can be arranged between optical lenses of the first subsystem along a folded optical axis of the first subsystem.

To vary at least one of the magnification of representation of the object that can be placed in the object plane, and a working distance of the microscope system, it can be advantageous if at least two lenses of the first subsystem can be displaced relative to each other along the optical imaging paths guided by the lenses.

According to an embodiment, the imaging system comprises a second subsystem containing several optical lenses, each of which are traversed by only one optical imaging path of the at the least one pair of optical imaging paths. The beams, or rays, which are respectively guided by the optical lenses of the second subsystem, define the course of the optical imaging paths in the optical lenses of the first subsystem, and thus the course of the stereoscopic axes.

To further adjust the magnification of the representation of the object that can be placed in the object plane, it may be advantageous if at least two lenses of the second subsystem can be displaced relative to one another along the common optical imaging path.

According to a further embodiment the above object is achieved by a microscope system for imaging an object that can be placed in an object plane of the microscope system, which microscope system comprises at least one imaging system for providing at least one pair of optical imaging paths, which include a stereoscopic angle in the object plane. This embodiment may be based on the embodiments described above. The imaging system comprises a first subsystem containing several optical lenses that are commonly traversed by both optical imaging paths of the at least one pair of optical imaging paths. Furthermore, the imaging system comprises a second subsystem containing several optical lenses which respectively are traversed by only one optical imaging path of the at least one pair of optical imaging paths. At least two lenses of the first subsystem and at least two lenses of the second subsystem are displaceable along one common optical imaging path relative to each other, to respectively adjust the magnification of the representation of the object that can be placed in the object plane.

Consequently, the adjustable magnification of the representation of the object that can be placed in the object plane, which magnification is achieved by the microscope system, can be split up within the microscope system in two zoom systems arranged in series, wherein the first zoom system is arranged in the first subsystem and the second zoom system is arranged in the second subsystem.

It may provide benefits if the microscope system further comprises a lighting system containing an optical lighting path for illuminating the object plane.

A microscope system having the features described above is especially suitable for use as a stereoscopic microscope, and especially as a surgical microscope, due to its compact structure.

BRIEF DESCRIPTION OF THE DRAWINGS

In the following, preferred embodiments of the present invention will be described with reference to the enclosed Figures. In the Figures, alike or similar reference signs are used to refer to like or similar elements.

DETAILED DESCRIPTION OF THE INVENTION

A preferred first embodiment of the present invention is described in the following, referring to FIGS. 1A and 1B.

Figure 1A:
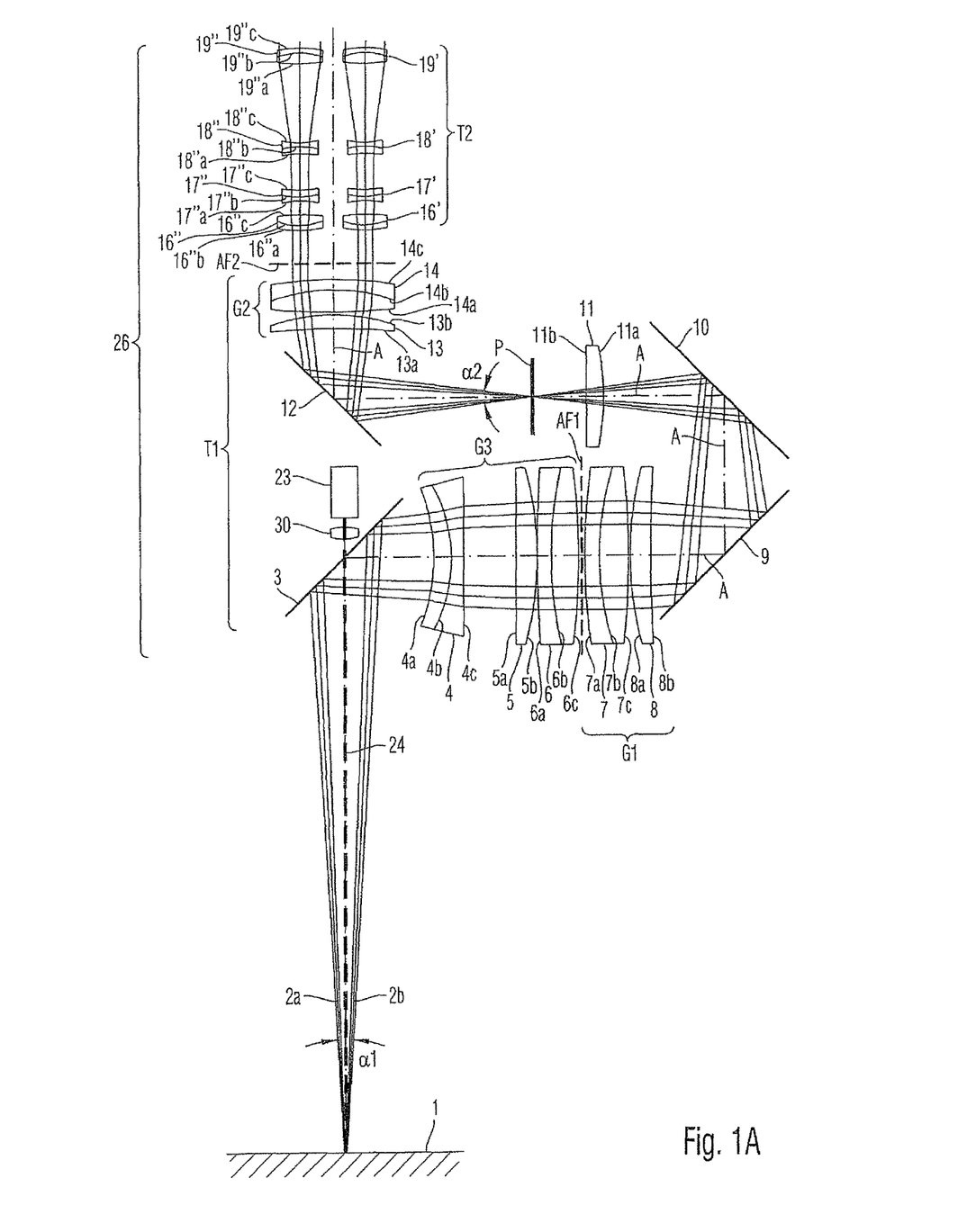
FIG. 1A schematically shows an optical path through an arrangement of basic elements of an imaging system of a microscope system according to a first preferred embodiment of the present invention, wherein the arrangement is unfolded in one plane.

FIG. 1A schematically shows an optical path through an arrangement of basic elements of an imaging system 26 of a microscope system according to the preferred first embodiment of the present invention, wherein the arrangement is unfolded in one plane.

The microscope system according to the first preferred embodiment comprises an optical imaging system 26 that provides a pair of optical imaging paths 2a and 2b. Alternatively, the imaging system 26 can provide a single optical imaging path, or more than one pair of optical imaging paths.

The optical imaging paths 2a and 2b intersect pairwise, in the object plane 1. Stereoscopic axes of the optical imaging paths intersect including a first stereoscopic angle $\alpha 1$. Thus, the microscope system forms a stereoscopic microscope. Dependent on the operating state of the microscope system, the first stereoscopic angle $\alpha 1$ in FIG. 1A ranges from 4° to 10°. However, the present invention is not restricted to this range of angles. It is generally sufficient if the stereoscopic angle is different from 0°.

The imaging system 26 consists of a first optical subsystem T1 and a second optical subsystem T2, each subsystem T1 and T2 consisting of several optical elements.

The first optical subsystem T1 consists of the following elements that are arranged along one common optical axis A: a first optical deflection element having a first optical mirror surface 3; first, second, third, fourth and fifth optical lenses, 4, 5, 6, 7 and 8; a second optical deflection element having a second optical mirror surface 9; a third optical deflection element having a third optical mirror surface 10; a sixth optical lens 11; a fourth optical deflection element having a fourth optical mirror surface 12; and seventh and eighth optical lenses 13 and 14. The lenses 4, 5, 6, 7, 8, 11, 13 and 14 of the first subsystem T1 are commonly traversed by both optical imaging paths 2a and 2b.

The optical imaging paths 2a and 2b are reflected, and thus deflected, in sequence on the first mirror surface 3, the second mirror surface 9, the third mirror surface 10 and the fourth mirror surface 12. It is evident that even the common optical axis A of the first subsystem T1, that is defined by the lenses 4, 5, 6, 7, 8, 11, 13 and 14, is deviated multiple times by the mirror surfaces 3, 9, 10 and 12.

Figure 1B:
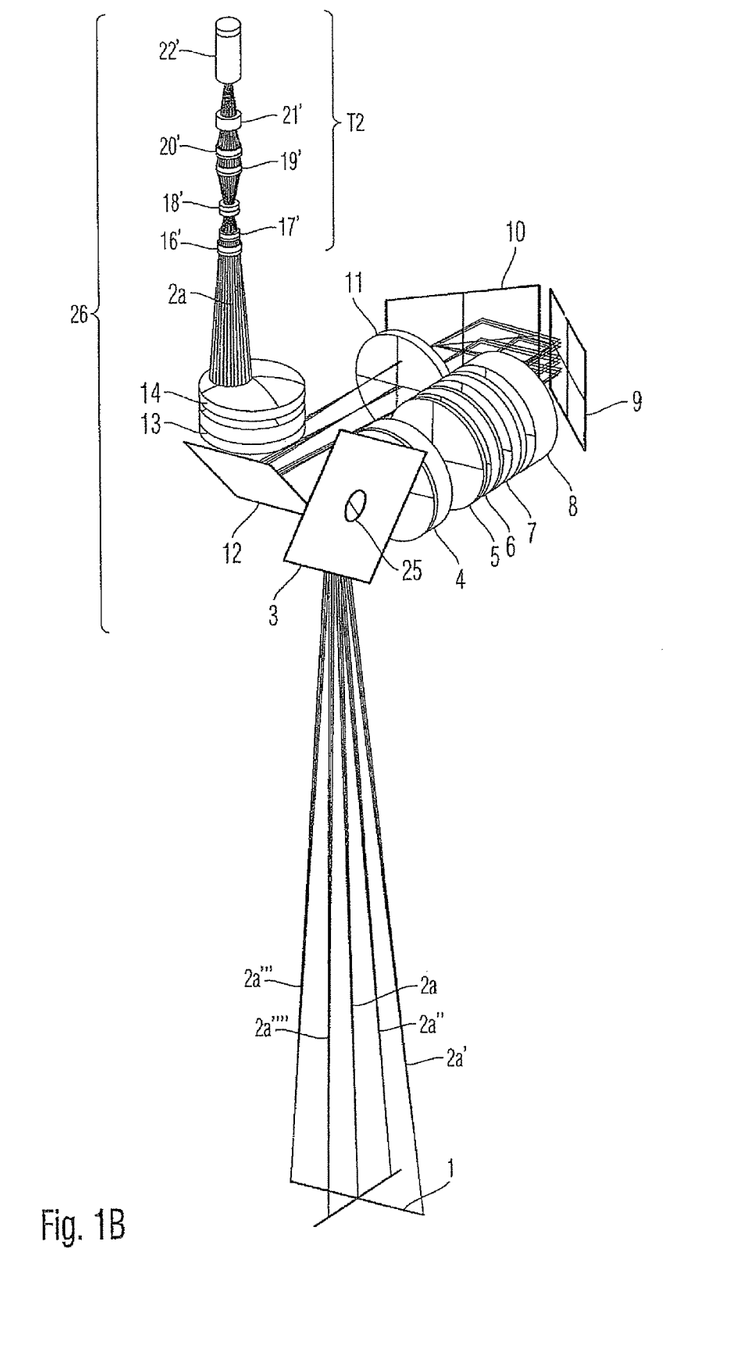
FIG. 1B schematically shows a perspective view of a spatial arrangement of the basic elements of the imaging system of FIG. 1A.

It is also apparent from FIG. 1B that normal vectors of the planes defined by the first mirror surface 3 and the fourth mirror surface 12, as well as normal vectors of the planes defined by the second mirror surface 9 and the third mirror surface 10, relative to each other, include a constant angle of 90°. However, the angle may differ from 90° and especially range between 60° and 110° and preferably between 80° and 100°. It is also apparent from FIG. 1B that normal vectors of the planes defined by the third mirror surface 10 and the fourth mirror surface 12, relative to each other, include a constant angle of 60°. However, the angle may differ from 60° and especially range between 40° and 80° and preferably between 50° and 70°.

This arrangement of the first to fourth mirror surfaces 3, 9, 10 and 12 optically operates in the same way as a Porro-system of the second kind.

This means that the first to fourth mirror surfaces 3, 9, 10 and 12 cause both images reversal and permutation of the pupils. Furthermore, an especially compact structure of the imaging system 26 is achieved by this arrangement of the mirror surfaces 3, 9, 10 and 12, due to the multiple folding of the optical imaging paths 2a and 2b.

In this first preferred embodiment the optical lenses 4 to 8 and 11 are configured such that the object plane 1 is imaged demagnified to a factor of 0.36 (which means demagnified by 64%) in an intermediate image P. In this respect, the intermediate image P is a plane that is optically conjugated to the object plane 1 (this plane may even be curved). The intermediate image P is arranged between the sixth and seventh lens 11, 13, and in more detail between the sixth lens 11 and the fourth mirror surface 12. It is emphasized that the present invention is not restricted to a reduction of the object plane to 0.36 times in the intermediate image P, or to the above arrangement of the intermediate image P. It is generally sufficient if the object plane is imaged demagnified to a maximum of 0.9 times, and especially to a maximum of 0.8 time, and further especially to a maximum of 0.6 times, and further especially to a maximum of 0.5 times in the intermediate image P.

Considering that the basic object of a microscope system is to provide a magnified representation of an object that can be placed in the object plane 1, it may be surprising that, in the microscope system according to the first preferred embodiment of the present invention, the object plane 1 is not imaged magnified, but demagnified (decreased) in the intermediate image P. However, significant advantages are achieved by this feature, as will be described in the following.

Figure 2A:
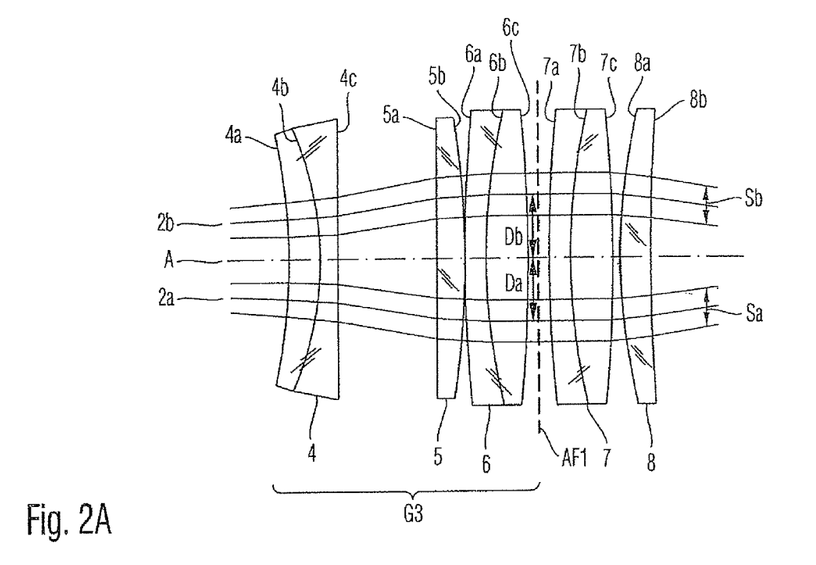
FIG. 2A schematically shows an optical path through optical lenses of the imaging system shown in FIG. 1A at a larger scale.

In the intermediate image P the optical imaging paths 2a and 2b intersect including a second stereoscopic angle α2, wherein a ratio of the first stereoscopic angle α1 in the object plane 1 to the second stereoscopic angle α2 in the intermediate image P is smaller than 0.9 and preferably smaller than 0.8, and especially preferably smaller than 0.6. In the present case, the second stereoscopic angle α2 is 19.6°, and the stereoscopic angle at the object-side α1 is 7°. Thus, this ratio is 0.36. Furthermore, an afocal interface AF1 or AF2, respectively, is arranged between the third optical lens 6 and the fourth optical lens 7, as well as succeeding the eight optical element 14, wherein the optical presentation paths 2a and 2b are focused to infinity in the afocal interfaces. The provision of the afocal interfaces AF1 and AF2 provides for a modular structure of the imaging system 26 of the microscope system. In FIG. 2A, the afocal interface AF1 is shown schematically at an enlarged scale.

As an alternative to the arrangement of the intermediate image P between the afocal interfaces AF1 and AF2, the optical imaging paths 2a and 2b may be guided in the lenses 4 to 8, 11, 13 and 14, respectively, such that the intermediate image P is arranged between two regions, in which a distance Da, Db of stereoscopic axes of the optical imaging paths 2a and 2b to the optical axis A defined by the lenses 4 to 8, 11, 13 and 14, respectively, is maximized.

Figure 2B:
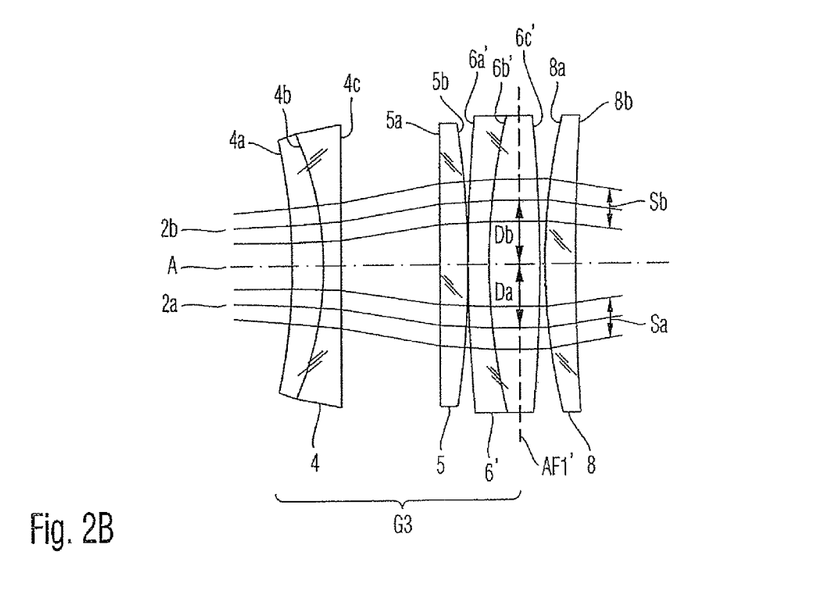
FIG. 2B schematically shows an optical path through optical lenses that may be used in the imaging system according to the first embodiment as an alternative to FIG. 2A.

Such a region AF1' is schematically shown in FIG. 2B. In FIGS. 1A and 1B these regions correspond to the afocal interfaces AF1 and AF2.

As is also evident from FIGS. 2A and 2B, a diameter Sa, Sb of a beam bundle guided in the optical beam paths 2a and 2b respectively has a maximum in the regions mentioned above, which correspond to the afocal interfaces AF1 and AF2 in FIGS. 1A and 1B.

These afocal interfaces AF1 and AF2 and the regions mentioned above, respectively, enable grouping of the optical lenses 4 to 8, 11, 13 and 14 of the first subsystem T1 of the first preferred embodiment, shown in FIGS. 1A and 1B, into three sets G1, G2, and G3.

The first set G1 comprises the lenses 7, 8 and 11, having the optically effective surfaces 7a, 7b, 7c, 8a, 8b, 8c, 11a and 11b, and are arranged between the intermediate image P and a first one AF1 of the two afocal interfaces, this first afocal interface AF1 being arranged between the intermediate image P and the object plane 1. The total focal length of the first set G1 is 115.3 mm in the first embodiment.

The second set G2 is arranged between the intermediate image P and the other second afocal interface AF2 and comprises the lenses 13 and 14 containing the optically effective surfaces 13a, 13b, 14a, 14b and 14c. The total focal length of the second set G2 is 82.3 mm in the first embodiment.

The third set G3 it arranged between the first afocal interface AF1 and the object plane 1 and comprises the lenses 4, 5 and 6 having the optically effective surfaces 4a, 4b, 4c, 5a, 5b, 6a, 6b and 6c. The total focal length of the third set G3 is 322.5 mm in the first embodiment.

By using the sets G1, G2 and G3 defined above it is possible to identify preferred ratios for the refraction powers of the optically effective surfaces of the lenses of the respective sets. In this respect, an optically effective surface is defined as a surface of a lens that is traversed by optical imaging paths 2a and 2b, having a radius of curvature of a maximum 104 mm and especially a maximum $5 \times 10^3$ mm and further especially a maximum of $10^3$ mm. It is evident that a lens may belong to two different sets at the same time, if its optical surfaces belong to different sets.

For the compact structure of the inventive microscope system, which is desired by the underlying problem for a total magnification corresponding to that of the prior art, it has been found to be especially advantageous if a ratio of the total focal length (i.e. the sum of the focal lengths) of the optically effective surfaces 7a, 7b, 7c, 8a, 8b, 11a and 11b of the lenses 7, 8 and 11 of the first set G1 to the total focal length of the optically effective surfaces 13a, 13b, 14a, 14b and 14c of the lenses 13 and 14 of the second set G2 is at least 1.1 and especially at least 1.2 and further especially at least 1.4. In the first embodiment shown in FIG. 1A this ratio is 1.40. This ratio may even be denoted as the afocal magnification factor of the reversal system. The shown reversal system has the property that it comprises the optically effective elements between the first optical interface AF1 and the second optical interface AF2, that it causes image reversal and permutation of the pupils, and that it comprises the intermediate image P. This afocal magnification factor significantly contributes to the required total magnification of the microscope system.

An important requirement for the compact structure for the microscope system, that is desired according to the underlying object, is, respectively, the reduction of the representation of an object that can be placed in the object plane 1 in the intermediate image P, and the enlargement of the second stereoscopic angle α2 in the intermediate image P, in comparison to the first stereoscopic angle α1 in the object plane 1.

It has been found to be especially suitable if a ratio of the total focal length of the optically effective surfaces 7a, 7b, 7c, 8a, 8b, 11a and 11b of the lenses 7, 8 and 11 of the first set G1 to the total focal length of the optically effective surfaces 4a, 4b, 4c, 5a, 5b, 6a, 6b and 6c of the lenses 4, 5 and 6 of the third set G3 is between 0.2 and 0.6, and especially between 0.3 and 0.5, and further especially 0.4. In the first embodiment, shown in FIG. 1A, this ratio is 0.36. This ratio may even be termed the reproduction scale for an object that can be placed in the object plane 1 into the intermediate image P.

Further advantages can be achieved if a ratio of the total focal length of the optically effective surfaces 13a, 13b, 14a, 14b and 14c of the lenses 13 and 14 of the second set G2, to the total focal length of the optically effective surfaces 4a, 4b, 4c, 5a, 5b, 6a, 6b and 6c of the lenses 4, 5 and 6 of the third set G3, is between 0.1 and 0.6 and especially between 0.2 and 0.5, and more especially 0.3. In the first embodiment, shown in FIG. 1A, this ratio is 0.255. This ratio consists of the loupe magnification of the object plane 1 to infinity of VLO=250 mm/(focal length of the lenses 4,5,6) that is caused by the lenses 4, 5 and 6 and the loupe magnification of the intermediate image P to infinity of VLO=250 mm/(focal length of the lenses 13,14) that is caused by lenses 13 and 14.

The ratio of the respective distances Da, Db of stereoscopic axes of the optical imaging paths 2a and 2b from the optical axis A in the first afocal interface AF1, respectively in the first region, to the respective distances of stereoscopic axes of the optical imaging paths from the optical axis A in the second afocal interface AF2, respectively in the second region, is maximally 1.1 and preferably maximally 1.2 and further preferably 1.4. With respect to the distances of the stereoscopic axes from the optical axis defined by the respective lenses in the respective afocal interfaces, respectively regions, reference is complementarily made to FIGS. 2A, 2B.

The ratios defined above are all suitable to contribute to at least one of a demagnified representation of the object plane 1 in the intermediate image P and a magnification of the second stereoscopic angle α1 in the intermediate image P in comparison to the first stereoscopic angle α2 in the object plane 1. However, it is not obligatory that all of the above ratios are fulfilled at the same time, as long as at least one of a demagnified representation of the object plane 1 into the intermediate image P to a maximum of 0.9 times, and an enlargement of the second stereoscopic angle α2 in the intermediate image P in comparison to the first stereoscopic angle 01 in the object plane 1 to at least 1.1 times is achieved. In this respect, the stereoscopic angles α1 and α2, respectively, are defined by the stereoscopic basis of the imaging system 26.

The second subsystem T2, of the imaging system 26 also contains a plurality of optical lenses 16' to 19' and 16" to 19", in which the optical imaging paths 2a and 2b are guided separately, in contrast to the first subsystem T1. This means that the optical lenses 16' to 19' and 16" to 19", 16''' to 19''' are respectively traversed by one optical imaging path 2a or 2b, each.

The stereoscopic axes are defined by the respective centers of the two (stereoscopic) optical imaging paths 2a and 2b for an object point of the object that can be placed in the object plane 1, the object point corresponding to the center of the representation caused by the microscope system. As an alternative to this object point it is also possible to directly use a point in the object plane 1 that corresponds to the center of the representation caused by the microscope system. This definition of the stereoscopic axes is best understood by referring to FIGS. 1A and 1B. In FIG. 1A beam bundles of the two (stereoscopic) optical imaging paths 2a and 2b for imaging one point in the object plane 1 are shown, the point corresponding to the center of the representation caused by the microscope system. The central rays of the beam bundles of these two optical imaging paths 2a and 2b define the two stereoscopic axes. In FIG. 1B only beam bundle 2a, 2a', 2a", 2a''' and 2a'''' of only one optical imaging path are shown. In this respect, one beam bundle of the optical imaging path for the representation of one point of the object plane, corresponding to the center of the representation caused by the microscope system, is designated 2a and represents the whole optical imaging path. Central rays of this beam bundle 2a can be used to define the stereoscopic axes. However, the central rays of the boundary beam bundles 2a', 2a", 2a''' and 2a'''' of the optical imaging path, that are additionally shown in FIG. 1B, cannot be used to define the stereoscopic axes. In this respect, the optical lenses 16' to 19' and 16" to 19" of the second subsystem T2, due to the beam bundles guided therein, also define the course of the optical imaging paths 2a and 2b in the optical lenses 4, 5, 6, 7, 8, 11, 13 and 14 of the first subsystem T1, and thus the course of the stereoscopic axes.

Via the optical lenses 16' to 19' and 16" to 19" of the second subsystem T2 and the seventh and eighth lenses 13 and 14 of the second set G2 of the first subsystem T1 the intermediate image P is imaged in a magnified way. As the object plane 1 is imaged in a demagnified way into the intermediate image P, and/or the second stereoscopic angle α2 in the intermediate image P is enlarged in comparison to the first stereoscopic angle α1 in the object plane 1, this magnified representation of the intermediate image P in the second subsystem T2 can be achieved by optical elements such as lenses having small diameters and small relative distances from one another along the respectively guided optical imaging paths 2a and 2b. Consequently, the imaging system 26 of the microscope system according to the invention has an especially compact structure.

Figure 3:
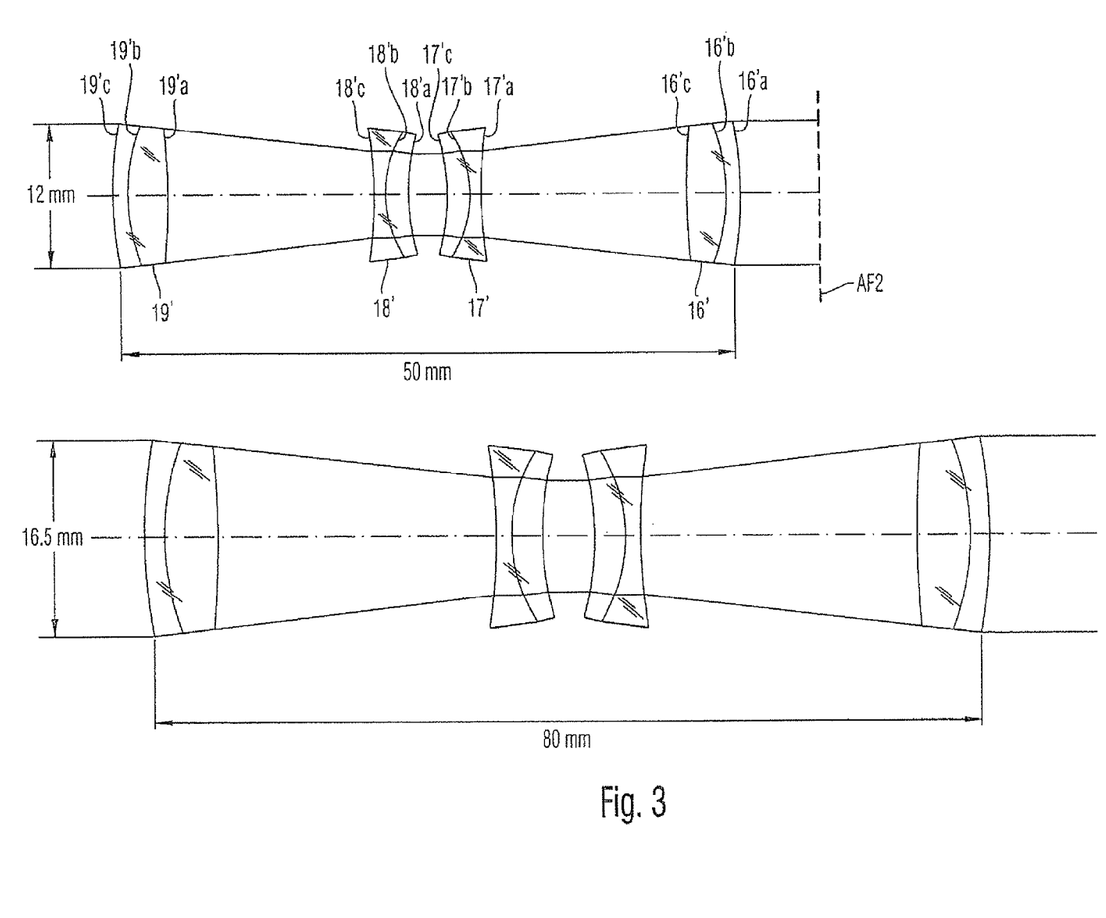
FIG. 3 provides as exemplary comparison between the sizes of lenses of the microscope system according to the present invention and the corresponding lenses of a conventional microscope system.

FIG. 3 shows in an exemplary way a comparison of sizes between lenses 16' to 19' of the second subsystem T2 of the microscope system according to the invention (at the top of the Figure) with corresponding lenses of a conventional microscope system (at the bottom of the Figure).

As indicated in FIG. 1B, each optical imaging path 2a and 2b of the second subsystem T2 may each further contain two optical lenses 20' and 21' and one camera-adapter 22' for a digital camera (not shown in FIG. 2A or 2B) for generating image data. Alternatively, two separate digital cameras, or else one stereoscopic camera, may be provided for both optical imaging paths 2a, 2b.

According to an alternative embodiment that is not separately shown, a tube having ocular optics, for direct visual observation by a user, may be provided for each optical imaging path 2a and 2b of the second subsystem T2 instead of optical lenses 20' and 21', as well as of the camera-adapted 22'.

According to a further aspect of the present invention, according to a first embodiment shown in FIGS. 1A and 1B, the first lens 4 is displaceable relative to the second lens 5 along the optical axis A and thus along the optical imaging paths 2a and 2b guided therein, and the third lens 6 is displaceable relative to the fourth lens 7 along the optical axis A and thus along the optical imaging paths 2a and 2b guided therein, to vary a distance of the object plane 1 to the imaging system 26 of the microscope system, and thus to vary a working distance and a magnification of the representation of an object which can be placed in the object plane 1. At the same time it is automatically guaranteed, by suitable choice of the system data of these optical lenses 4, 5, 6 and 7 of the first optical subsystem, that the optical imaging paths 2a and 2b intersect in the object plane including the stereoscopic angle α1 that is different from zero, even after the displacement of the lenses 4, 5, 6 and 7.

In addition, three distances between four lenses 16' to 19' and 16" to 19" of the second subsystem T2 that are arranged along one common optical axis in each of the respective optical imaging paths 2a and 2b, respectively, are displaceable relative to one another along the optical axis and thus also along the respective common optical imaging paths 2a and 2b guided therein, to vary a magnification of the respective representation caused by the second subsystem T2 in the respective optical imaging paths 2a and 2b.

Instead of displaceable lenses, optical elements with variable refraction force, such as liquid lenses may be used as an alternative.

Consequently, the microscope system according to the invention, as shown in FIGS. 1A and 1B, comprises two zoom systems that are arranged in series, wherein one zoom system is provided by optical lenses of the first subsystem T1 and the second zoom system is provided by optical lenses of the second subsystem T2, and wherein the effects thereof complement one another.

The optical system data of the stereoscopic microscope shown in FIG. 1A are as follows:

| Surface | Radius [mm] | Thickness [mm] | Medium | Free Diameter [mm] |
|---|---|---|---|---|
| | | Camera-adapter/tube | | |
| 19"c | 28.930 | | | 12.00 |
| | | 1.2 | LAFN7 | |
| 19"b | 15.052 | | | 11.8 |
| | | 3.0 | NPSK53 | |
| 19"a | −144.79 | | | 11.5 |
| | | 22.68 . . . 1.02 | Air | |
| 18"c | −35.928 | | | 10.0 |
| | | 1.2 | NBAF4 | |
| 18"b | 9.9568 | | | 10.0 |
| | | 2.0 | NSF6 | |
| 18"a | 19.467 | | | 9.5 |
| | | 11.5 . . . 11.5 | Air | |
| 17"c | −19.467 | | | 9.5 |
| | | 2.0 | NSF6 | |
| 17"b | −9.9568 | | | 10.0 |
| | | 1.2 | NBAF4 | |
| 17"a | 35.928 | | | 10.5 |
| | | 1.02 . . . 22.68 | Air | |
| 16"c | 144.79 | | | 11.5 |
| | | 3.0 | NPSK53 | |
| 16"b | −15.052 | | | 11.8 |
| | | 1.2 | LAFN7 | |
| 16"a | −28.930 | | | 12.0 |
| | | 20.0 | Air | |
| 14c | 102.55 | | | 34.0 |
| | | 3.0 | LAFN7 | |
| 14b | 50.047 | | | 34.0 |
| | | 6.0 | NFK51 | |
| 14a | −197.88 | | | 34.0 |
| | | 1.0 | Air | |
| 13b | 52.089 | | | 34.0 |
| | | 4.0 | NFK51 | |
| 13a | 306.55 | | | 34.0 |
| | | 20.0 | Air | |
| 12 | Plane | | | Mirror |
| | | 65.805 | Air | |
| 11b | Plane | | | 30.0 |
| | | 4.0 | LAFN7 | |
| 11a | −116.05 | | | 30.0 |
| | | 38.195 | Air | |
| 10 | Plane | | | Mirror |
| | | 44.0 | Air | |
| 9 | Plane | | | Mirror |
| | | 23.0 | Air | |
| 8b | −392.46 | | | 48.0 |
| | | 6.0 | NFK51 | |
| 8a | −75.151 | | | 48.0 |
| | | 1.0 | Air | |
| 7c | 273.58 | | | 48.0 |
| | | 8.0 | NFK51 | |
| 7b | −68.282 | | | 48.0 |
| | | 4.0 | LAFN7 | |
| 7a | −151.48 | | | 48.0 |
| | | 2.0 . . . 18.0 | Air | |
| 6c | 238.24 | | | 48.0 |
| | | 7.0 | NPSK53 | |
| 6b | −93.039 | | | 48.0 |
| | | 4.0 | SF56A | |
| 6a | −332.28 | | | 48.0 |
| | | 0.1 | Air | |
| 5b | 107.96 | | | 46.0 |
| | | 5.0 | NSK16 | |
| 5a | Plane | | | 46.0 |
| | | 16.5 . . . 0.5 | Air | |
| 4c | Plane | | | 45.0 |
| | | 3.0 | NSSK8 | |
| 4b | 43.717 | | | 42.0 |
| | | 5.0 | NSF6 | |
| 4a | 66.970 | | | 40.0 |
| | | 22.0 | Air | |
| 3 | Plane | | | Mirror |
| | | 224.0 . . . 424.0 | Air | |
| | | Object plane | | |

Figure 4:
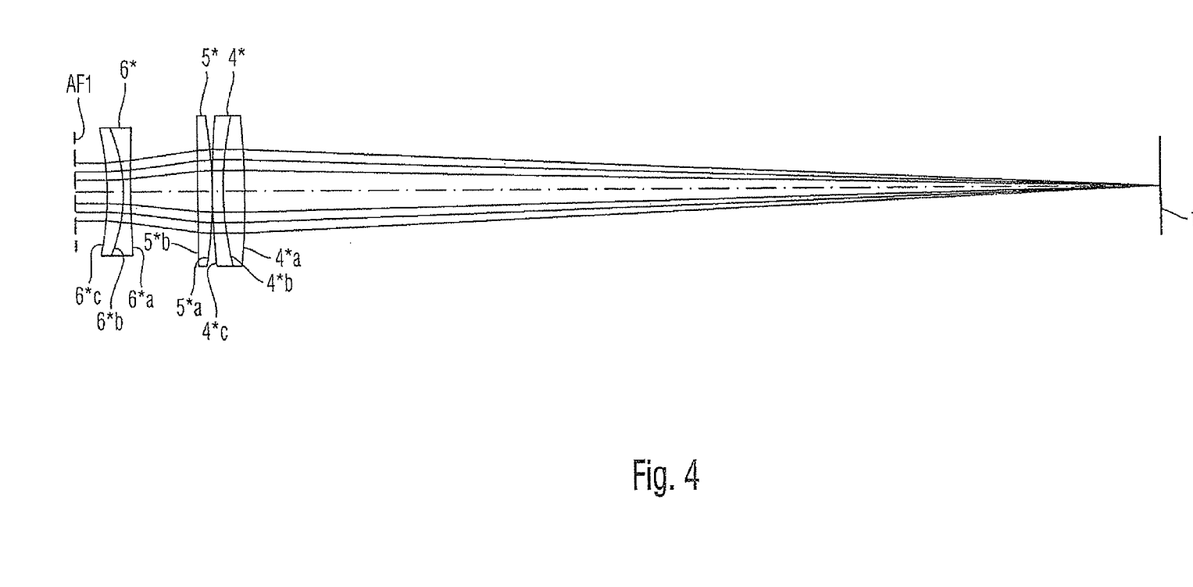
FIG. 4 shows an arrangement of lenses that may be alternatively used in the microscope system of FIG. 1A.

In FIGS. 1A and 1B the lenses 4, 5 and 6 form a televarioscope. However, a retrofocus-varioscope may be used as an alternative. A corresponding structure is schematically shown in FIG. 4, where lenses 4*, 5* and 6* have optically effective surfaces 4*a, 4*b, 4*c, 5*a, 5*b, 6*a, 6*b and 6*c.

The microscope system according to the first preferred embodiment further provides a secondary optical path 24 that traverses the first mirror surface 3 of the first deflecting element in a central area. This central area is preferably located between cross-sectional surfaces of rays of the optical imaging paths 2a and 2b. This can e.g. be guaranteed if the optical lenses of the first subsystem T1 cause a representation of pupils in the range of the first mirror surface. To this end the first mirror surface 3 has a cutout 25, which is shown in FIG. 1B. As an alternative to the provision of a cutout, it is also sufficient if the first mirror surface 3 provides at least in a partial area a transparence for radiation of the secondary optical path 24 that is higher than a transparence for a radiation of the optical imaging paths 2a and 2b. Alternatively, the integration of the secondary optical path 24 may be achieved in another way. Thus the microscope system shown in FIG. 1A provides a 0°-illumination for an object that can be placed in the object plane 1.

In FIG. 1A the secondary optical path 24 is provided by illumination optics 30 of an illumination system, wherein the illumination system further comprises a radiation source 23. This illumination system is not part of the imaging system 26.

Alternatively, in addition, or as an alternative to the illumination system comprising the illumination optics 30 and the radiation source 23, an infrared-imaging system (not shown in the Figure) having an infrared imaging optics and an infrared camera may be provided, wherein the infrared imaging optics provides the secondary optical path 24. Furthermore, also in addition, or as an alternative to the illumination system, a laser (not shown in the Figure) having a radiation guidance system (also not shown in the Figure) providing the secondary optical path 24 may be provided. Such a laser allows, for example, a therapeutic use for cancer treatment.

Furthermore, a beam splitter (also not shown in the Figures) may be provided which splits the optical imaging paths 2a and 2b by geometric or physical beam splitting. If this beam splitter is arranged between the first subsystem T1 and the second subsystem T2, and thus in the region of the second afocal interface AF2, a co-observation tube can be provided, this co-observation tube being freely pivotal and having a magnification that can be independently varied to a large extent. A co-observation tube that is freely pivotal accounts best for the ergonomic requirements of a user of the microscope system.

In the first preferred embodiment described above, the first, second, third and fourth deflecting elements are each optical mirrors. Alternatively, as an example, the deflection elements may be prisms, each having at least one mirror surface. Furthermore the first, second, third and fourth deflecting elements may optionally provide separate mirror surfaces for deflection of the optical imaging path 2a and 2b.

Alternatively, it is even possible to abstain totally or partially from a deflection of the optical imaging paths 2a and 2b. It is even possible that the optical imaging path is only deflected, once, twice, or three times, for example.

However, in consequence the structure of the microscope system may be significantly extended. Regardless of the alternatives used, the microscope system according to the present invention still comprises a structure that is more compact than a microscope system of the prior art that is folded in the same way. The reason for this is that the second subsystem T2 of the microscope system according to the invention is more compact than, but provides the same total magnification of the microscope systems as a corresponding second subsystem of a conventional microscope system. As a further alternative it is even possible to deflect the optical imaging paths 2a and 2b more often than four times.

The microscope system according to the first preferred embodiment is especially suited for use as a surgical microscope, as the imaging system 26 has an especially small overall height and an especially small construction volume.

FIG. 1B schematically shows a perspective view to illustrate the true spatial arrangement of basic elements of the imaging system 26 of the microscope system according to the first preferred embodiment (in contrast to the arrangement that is unfolded in one plane, as in FIG. 1A). For better clarity, only one optical imaging path 2a is shown in FIG. 1B, and the illumination system is also not shown.

It is a disadvantage of microscope systems as described above in which it is possible to adjust at least one of a magnification of the representation and a working distance by displacing optical lenses, that the variation of the working distance, that is considered to be very advantageous by a user, is usually accompanied with a discrepancy between the focal length and the respective working distance. For example, the is significantly the focal length in a televarioscope system is significantly larger than the working distance, whereas the focal length is significantly shorter than the working distance in a retrofocus-varioscope system.

Figure 5:
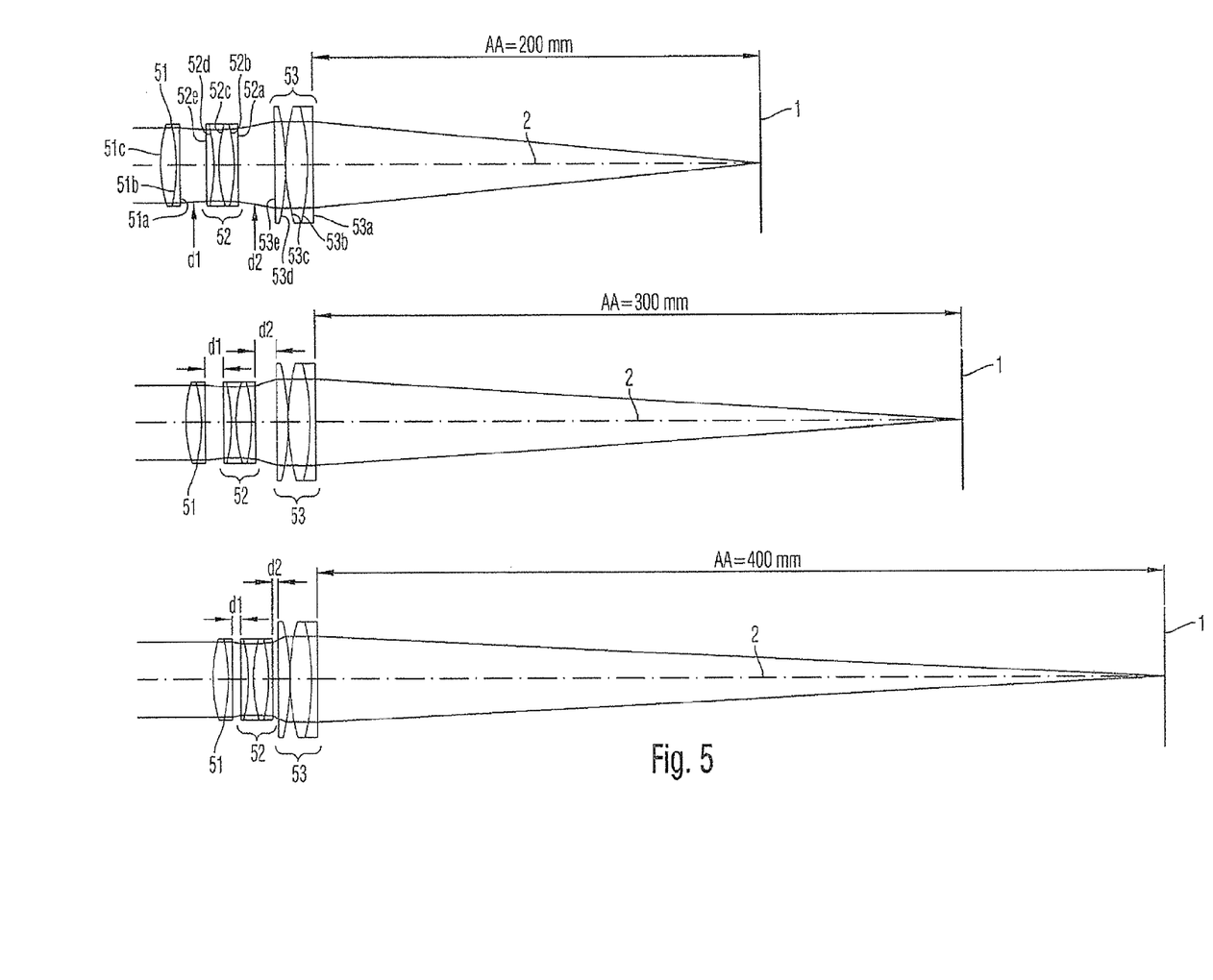
FIG. 5 shows different operating states of a further arrangement of lenses that can be used as an alternative in the microscope system of FIG. 1A.
Figure 6:
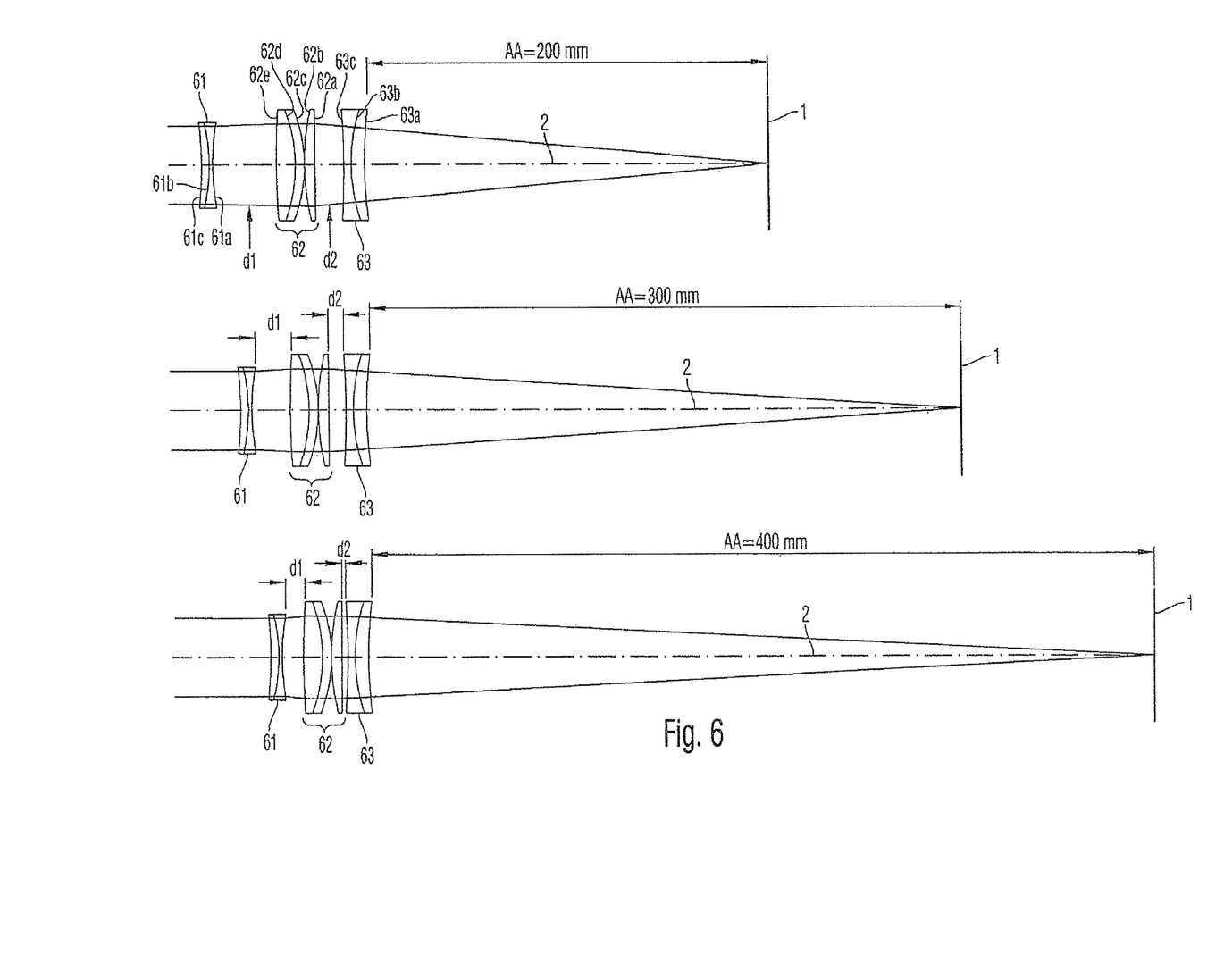
FIG. 6 shows different operating states of a further arrangement of lenses that alternatively may be used in the microscope system of FIG. 1A.

To solve this problem the trifurcated varioscope system shown in FIGS. 5 and 6 is proposed. This trifurcated varioscope system has three optical components 51,52,53, and 61,62,63, that respectively are arranged in series, which are sequentially traversed by the at least one optical imaging path.

In FIGS. 5 and 6, the first optical components 51,61 respectively are each formed by one optical lens. Further, the second optical components 52,62 respectively each are formed by two optical lenses that are stationary relative to one another.

In FIG. 5 two optical lenses that are separated from each other by a constant distance also form the third optical component 53, whereas in FIG. 6 the third optical component 63 is formed by only one optical lens.

By well defined simultaneous variation of air distances d1 and d2 between the three optical components 51,52,53, and 61,62,63, respectively, a varioscope system having the properties of a main objective having a fixed focal length is provided, to guarantee an adjustment of the focal length to a working distance AA from an object plane 1 even after a variation of the working distance.

The system data of the retrofocus-varioscope system shown in FIG. 5 are as follows:

| Surface | Radius [mm] | Thickness [mm] | Medium | Free Diameter [mm] |
|---|---|---|---|---|
| 51c | 80.963 | | | 20.0 |
| | | 4.0 | NSSKS | |
| 51b | −45.484 | | | 20.0 |
| | | 2.0 | NSF6 | |
| 51a | −123.82 | | | 20.0 |
| | | 8.2 … 1.2 | Air | |
| 52e | −1524.4 | | | 20.0 |
| | | 3.0 | SF57 | |
| 52d | −40.485 | | | 20.0 |
| | | 2.0 | NPSK53 | |
| 52c | 37.668 | | | 20.0 |
| | | 3.0 | Air | |
| 52b | −34.879 | | | 20.0 |
| | | 2.0 | NPSK3 | |
| 52a | 172.34 | | | 20.0 |
| | | 7.7 … 1.7 | Air | |
| 53e | 209.32 | | | 32.0 |
| | | 4.0 | NPSK53 | |
| 53d | −55.334 | | | 32.0 |
| | | 0.1 | Air | |
| 53c | 70.408 | | | 32.0 |
| | | 7.0 | NPSK53 | |
| 53b | −47.754 | | | 32.0 |
| | | 3.0 | NSF6 | |
| 53a | −564.00 | | | 32.0 |
| AA = 200 … 400 | | | | |

Suitable distances d1 and d2 between the optical components 51,52 and 53 of the retrofocus-varioscope system shown in FIG. 5 are quoted in the following table:

| AA [mm] | d1 [mm] | d2 [mm] |
|---|---|---|
| 200 | 8.16 | 7.74 |
| 300 | 3.51 | 3.56 |
| 400 | 1.18 | 1.72 |

The system data of the tele-varioscope system shown in FIG. 6 are as follows:

| Surface | Radius [mm] | Thickness [mm] | Medium | Free Diameter [mm] |
|---|---|---|---|---|
| 61c | −119.41 | | | 25.0 |
| | | 3.0 | SF57 | |
| 61b | −69.972 | | | 25.0 |
| | | 2.0 | NBAF52 | |
| 61a | 126.85 | | | 25.0 |
| | | d1 = 19.9 … 5.8 | Air | |
| 62e | 304.82 | | | 32.0 |
| | | 6.0 | NPSK53 | |
| 62d | −31.227 | | | 32.0 |
| | | 3.0 | SF57 | |
| 62c | −56.307 | | | 32.0 |
| | | 0.1 | Air | |
| 62b | 66.072 | | | 32.0 |
| | | 4.0 | NPSK53 | |
| 62a | −411.61 | | | 32.0 |
| | | d2 = 7.0 … 1.1 | Air | |
| 63c | −276.18 | | | 32.0 |
| | | 3.0 | NSSK8 | |
| 63b | 27.297 | | | 32.0 |
| | | 4.0 | NSF6 | |
| 63a | 47.864 | | | 32.0 |
| AA = 200 … 400 | | | Air | |

The distances d1 and d2 between the optical components 61,62, and 63 for specified working distances AA from the object plane 1 are as follows:

| AA [mm] | d1 [mm] | d2 [mm] |
|---------|---------|---------|
| 200 | 19.88 | 7.03 |
| 300 | 10.52 | 3.26 |
| 400 | 5.84 | 1.06 |

In summary, the above solution that has been described with reference to FIGS. 5 and 6 differs from conventional varioscope systems in that for variations of the working distance two air distances d1 and d2 between the three optical components 51,52 and 53, and 61,62 and 63 respectively, are varied, wherein in conventional varioscopes only one air distance must be varied for variation of the working distance. The varioscope systems described above with constant focal length do not have an as compact structure as conventional varioscope systems working according to the known tele-principle or retrofocus-principle. However, this disadvantage is compensated for to a large extent by the folded structure of the microscope system itself, and is more than compensated for by the achieved advantages of the varioscope system having constant focal length. Additionally they provide an up to now unknown solution to the requirement to overcome the discrepancy between working distance and focal length that exists with conventional varioscope systems.

Consequently, the varioscope system having constant focal length that is shown in FIGS. 5 and 6 is especially suited for the microscope system described above according to the first preferred embodiment of the present invention.

Figure 7:
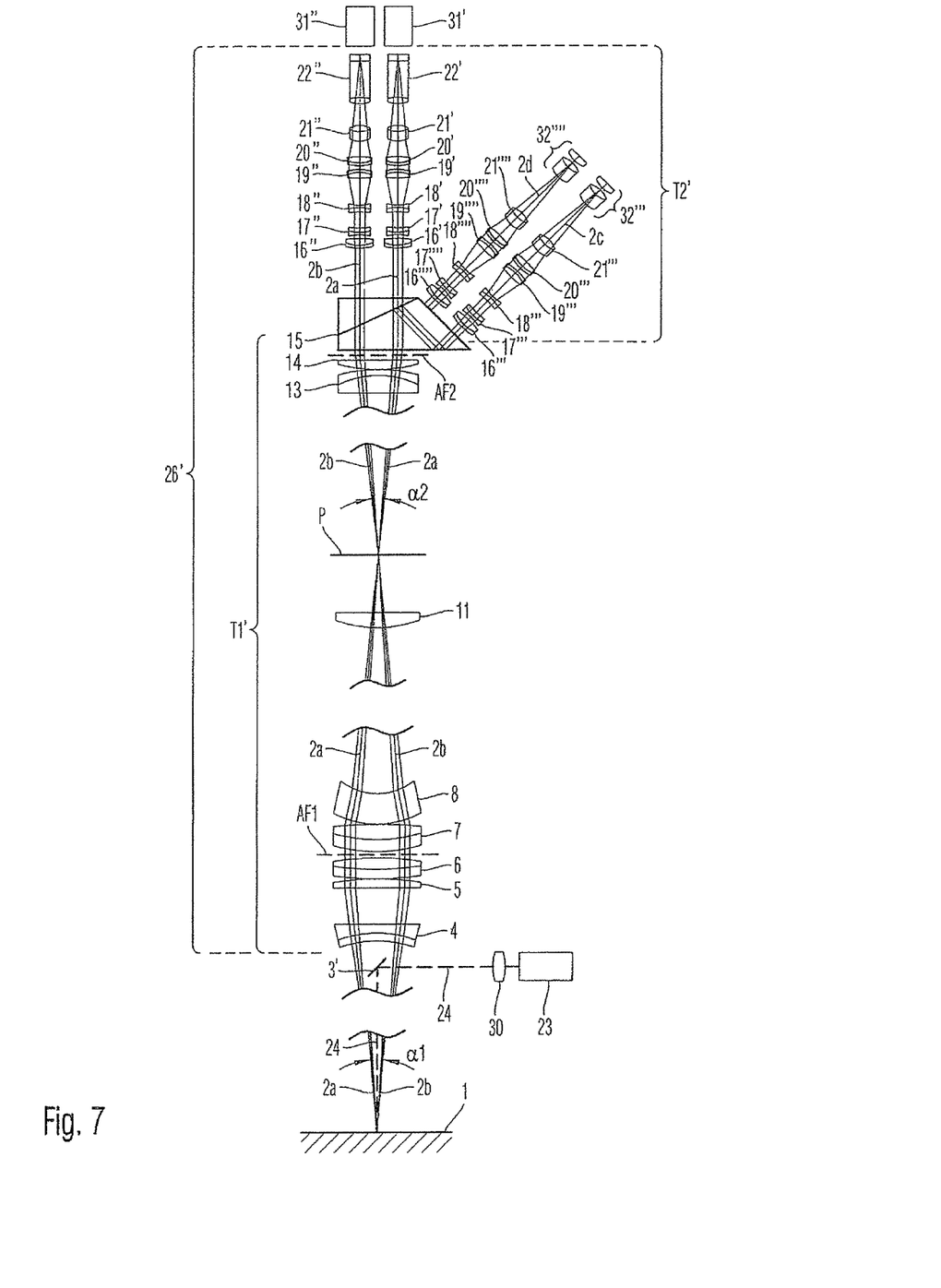
FIG. 7 schematically shows an optical path of an imaging system of a microscope system according to a second embodiment of the present invention.

In the following a second embodiment according to the present invention is described with reference to FIG. 7. In FIG. 7, an optical path through an arrangement of optical elements of an imaging system 26' of the microscope system is schematically shown, unfolded in one plane. The structure of the microscope system according to the second embodiment corresponds in basic parts to the structure of the microscope system according to the first embodiment, described in detail above. Consequently, only the differences between the first and second embodiment will be described in detail below.

The microscope system according to the second embodiment also comprises an imaging system 26', for imaging an object (not shown) that can be placed in an object plane 1. In this respect, the imaging system 26' provides two pairs of optical imaging paths 2a,2b and 2c,2d. The imaging system 26' consists (similarly as in the first embodiment described above) of a first subsystem T1' having multiple optical lenses 4 to 8 and 11 in which the optical imaging paths 2a to 2d are commonly guided, and a second subsystem T2' having multiple optical lenses 16' to 21', 22', 16" to 21", 22", 16''' to 21''', and 16'''' to 21'''', in which the optical imaging-paths 2a to 2d are guided separately. In this embodiment lenses of the first and second subsystems T1' and T2' are also displaceable relative to one another to adjust the working distance and vary the magnification of the representation, respectively. A further description of these elements is avoided.

It is essential in the second embodiment that is shown in FIG. 7 that no deflecting elements for deflecting the optical imaging paths 2a to 2d are provided. Only the optical imaging paths 2c and 2d are folded in a freely pivotal beam splitter 15, to be separated from the optical imaging paths 2a and 2b and to provide ergonomic adaptation of the optical imaging paths.

FIG. 7 additionally shows two digital cameras 31' and 31" that generate image data by using the rays guided by the optical imaging paths 2a and 2b. Furthermore, two ocular optics 32''' and 32'''' are provided for direct visual observation of radiation guided by the optical imaging paths 2c and 2d by an observer.

In the second embodiment integration of the zero-degree illumination is provided by an illumination mirror, that is arranged in a pupil plane of the optical imaging paths 2a to 2d between cross-sectional surfaces of radiation guided by the optical imaging path 2a to 2d.

The microscope system according to the second embodiment can also be combined with a varioscope system having a constant focal length as shown in FIGS. 5 and 6.

In summary, a microscope system for imaging of an object that can be placed in an object plane of the microscope system is proposed, which microscope system has an especially compact structure for a desired total magnification due to at least one of a demagnified representation of the object plane into an intermediate image and an increased stereoscopic angle in the intermediate image in comparison to the stereoscopic angle in the object plane.

What is claimed is:

1. A microscope system for imaging of an object that can be placed in an object plane of the microscope system, the microscope system comprising:
an imaging system for providing at least two optical imaging paths that include a stereoscopic angle in the object plane, the imaging system comprising:
a first subsystem comprising a first plurality of optical lenses that are commonly traversed by the at least two optical imaging paths; and
a second subsystem comprising a second plurality of optical lenses each of which being traversed by only one of the at least two optical imaging paths,
wherein:
at least two optical lenses of the first plurality of optical lenses that form a first zoom system and at least two optical lenses of the second plurality of optical lenses that form a second zoom system are displaceable relative to one another,
each one of the at least two optical imaging paths traverses at least four optical lenses of the second subsystem and three distances between the at least four optical lenses are adjusted to vary a magnification of a representation of the object passing through the imaging system via said one of the at least two optical imaging paths, and
wherein the imaging system further comprises a first mirror surface, a second mirror surface, a third mirror surface, and a fourth mirror surface for deflection of the at least two optical imaging paths and the at least two optical imaging paths are deflected in sequence by the first mirror surface, the second mirror surface, the third mirror surface, and the fourth mirror surface.

2. The microscope system according to claim 1 wherein the microscope system further comprises a lighting system having an optical lighting path for illuminating the object plane.

3. The microscope system according to claim 1 wherein the microscope system is a stereo microscope.

4. The microscope system according to claim 3 wherein the stereo microscope comprises a surgical microscope.

5. The microscope system according to claim 1 wherein the first mirror surface and the fourth mirror surface include an angle of between 80° and 100° relative to one another, as well as wherein the second mirror surface and the third mirror surface include an angle of between 80° and 100° relative to one another, and wherein the third mirror surface and the fourth mirror surface include an angle of between 50° and 70° relative to one another.

6. The microscope system according to claim 5 wherein the angle between the first mirror surface and the fourth mirror surface is 90°.

7. The microscope system according to claim 5 wherein the angle between the second mirror surface and the third mirror surface is 90°.

8. The microscope system according to claim 5 wherein the angle between the third mirror surface and the fourth mirror surface is 60°.

9. The microscope system according to claim 5 wherein at least one of the second mirror surface, the third mirror surface, and the fourth mirror surface is arranged between optical lenses of the first plurality of optical lenses.

10. The microscope system according to claim 1,
wherein at least one of the second mirror surface, the third mirror surface, and the fourth mirror surface is arranged between optical lenses of the first plurality of optical lenses.

11. The microscope system according to claim 1,
wherein the first plurality of optical lenses belonging to the first subsystem comprise five optical lenses sequentially traversed by the at least two optical imaging paths, the five lenses forming a retrofocus-varioscope system having the following system data:
wherein d1 and d2 are distances between lenses of the retrofocus-varioscope system, and AA are specified working distances from the object plane.

| Surface | Radius [mm] | Thickness [mm] | Medium | Free Diameter [mm] |
|---------|-------------|----------------|--------|--------------------|
| 51c | 80.963 | 4.0 | NSSK8 | 20.0 |
| 51b | −45.484 | 2.0 | NSF6 | 20.0 |
| 51a | −123.82 | 8.2 . . . 1.2 | Air | 20.0 |
| 52e | −1524.4 | 3.0 | SF57 | 20.0 |
| 52d | −40.485 | 2.0 | NPSK53 | 20.0 |
| 52c | 37.668 | 3.0 | Air | 20.0 |
| 52b | −34.879 | 2.0 | NPSK3 | 20.0 |
| 52a | 172.34 | 7.7 . . . 1.7 | Air | 20.0 |
| 53e | 209.32 | 4.0 | NPSK53 | 32.0 |
| 53d | −55.334 | 0.1 | Air | 32.0 |
| 53c | 70.408 | 7.0 | NPSK53 | 32.0 |
| 53b | −47.754 | 3.0 | NSF6 | 32.0 |
| 53a | −564.00 | AA = 200 . . . 400 | | 32.0 |

12. The microscope system according to claim 11, wherein distances d1 and d2 between lenses of the retrofocus-varioscope system for specified working distances AA are selected as follows:

| AA [mm] | d1 [mm] | d2 [mm] |
|---------|---------|---------|
| 200 | 8.16 | 7.74 |
| 300 | 3.51 | 3.56 |
| 400 | 1.18 | 1.72. |

13. The microscope system according to claim 1,
wherein the first plurality of optical lenses belonging to the first subsystem comprise four optical lenses sequentially traversed by the at least two optical imaging paths, the four lenses forming a tele-varioscope system having the following system data:

| Surface | Radius [mm] | Thickness [mm] | Medium | Free Diameter [mm] |
|---------|-------------|----------------|--------|--------------------|
| 61c | −119.41 | 3.0 | SF57 | 25.0 |
| 61b | −69.972 | 2.0 | NBAF52 | 25.0 |
| 61a | 126.85 | d1 = 19.9 . . . 5.8 | Air | 25.0 |
| 62e | 304.82 | 6.0 | NPSK53 | 32.0 |
| 62d | −31.227 | 3.0 | SF57 | 32.0 |
| 62c | −56.307 | 0.1 | Air | 32.0 |
| 62b | 66.072 | 4.0 | NPSK53 | 32.0 |
| 62a | −411.61 | d2 = 7.0 . . . 1.1 | Air | 32.0 |
| 63c | −276.18 | 3.0 | NSSK8 | 32.0 |
| 63b | 27.297 | 4.0 | NSF6 | 32.0 |
| 63a | 7.864 | AA = 200 . . . 400 | Air | 32.0 | wherein d1 and d2 are distances between lenses of the tele-varioscope system, and AA are specified working distances from the object plane.

14. The microscope system according to claim 13, wherein distances d1 and d2 between lenses of the tele-varioscope system for specified working distances AA are selected as follows:

| AA [mm] | d1 [mm] | d2 [mm] |
|---------|---------|---------|
| 200 | 19.88 | 7.03 |
| 300 | 10.52 | 3.26 |
| 400 | 5.84 | 1.06. |

* * * * *